United States Patent [19]

Chao

[11] Patent Number: 5,314,944
[45] Date of Patent: May 24, 1994

[54] PRESSURE SENSITIVE ADHESIVE

[75] Inventor: Hung Y. Chao, Williamsville, N.Y.

[73] Assignee: Moore Business Forms, Grand Island, N.Y.

[21] Appl. No.: 955,065

[22] Filed: Oct. 1, 1992

[51] Int. Cl.$^5$ .................. C08J 3/02; C09J 133/06; C08L 33/06

[52] U.S. Cl. .................. 524/501; 524/523; 524/525

[58] Field of Search .......... 524/523, 525, 501

[56] References Cited

U.S. PATENT DOCUMENTS

| | | | |
|---|---|---|---|
| 2,613,191 | 10/1952 | McGaffin et al. | 260/29.2 |
| 3,380,938 | 4/1968 | Mistley et al. | 260/4 |
| 3,477,970 | 11/1969 | Beeman | 260/17 |
| 3,514,421 | 5/1970 | Kershaw et al. | 260/29.6 |
| 3,573,236 | 3/1971 | Barlow | 260/17 |
| 3,769,254 | 10/1973 | Anderson et al. | 260/33.4 PQ |
| 3,923,718 | 12/1975 | Arpin | 260/29.7 |
| 3,996,181 | 12/1976 | Hayashi et al. | 260/29.6 |
| 4,033,918 | 7/1977 | Hauber | 260/29.6 |
| 4,189,419 | 2/1980 | Takemoto et al. | 260/29.7 NR |
| 4,280,942 | 7/1981 | Green | 260/27 R |
| 4,438,232 | 3/1984 | Lee | 524/272 |
| 4,471,082 | 9/1984 | Kwok et al. | 524/46 |
| 4,503,184 | 3/1985 | Marongiu | 524/519 |
| 4,656,077 | 4/1987 | Larimore et al. | 428/156 |
| 4,666,771 | 5/1987 | Vesley et al. | 428/325 |
| 4,762,766 | 8/1988 | Melbye | 430/156 |
| 4,861,820 | 8/1989 | Toyoda et al. | 524/510 |
| 4,889,884 | 12/1989 | Dust et al. | 524/314 |
| 4,892,905 | 1/1990 | Lepert et al. | 524/499 |
| 4,902,370 | 2/1990 | Dust et al. | 156/327 |
| 5,143,972 | 9/1992 | Groves | 525/71 |

FOREIGN PATENT DOCUMENTS

62343A2 10/1982 European Pat. Off. .
1392614 8/1975 United Kingdom .
2097410A 11/1982 United Kingdom .

Primary Examiner—Joseph L. Schofer
Assistant Examiner—Wu C. Cheng
Attorney, Agent, or Firm—Finnegan, Henderson, Farabow, Garrett & Dunner

[57] ABSTRACT

A pressure sensitive adhesive is disclosed that is tack-free to the touch, but forms a permanent bond under moderate pressure. The pressure sensitive adhesive contains a tacky adhesive latex, a non-tacky latex or polymer, and an inert filler. The tacky adhesive latex provides the sealing properties, the non-tacky latex or polymer provides blocking properties and the filler absorbs oil that may adversely affect the sealing properties. The adhesive is tack-free to the touch yet becomes activated to form a permanent bond under moderate sealing pressure.

8 Claims, No Drawings

PRESSURE SENSITIVE ADHESIVE

BACKGROUND OF THE INVENTION

The present invention relates to a pressure sensitive adhesive composition and its application.

The majority of pressure sensitive adhesives disclosed by the prior art are tacky to the touch and present difficulties in storage and handling because they tend to exhibit "blocking" properties, i.e., they tend to adhere to themselves when stored on a reel. Thus, there exists a need for a pressure sensitive adhesive that is initially tack-free, but forms a permanent bond upon moderate sealing pressure.

U.S. Pat. No. 4,889,884 to Dust et al. discloses an adhesive that is capable of forming a seal to itself with application of pressure, yet resists blocking. However, Dust et al. does not disclose the presence of a filler. As a result, silicone oil, often used in the nip for cut sheet forms to protect the fused roll, would be expected to migrate to the surface of the adhesive and interfere with the sealing operation. Thus, there is an additional need for a pressure sensitive adhesive whose adhesive properties will not be adversely affected by contact with silicone oil.

SUMMARY OF THE INVENTION

Accordingly, it is an object of the present invention to overcome these and other disadvantages of the prior art.

It is another object of the invention to provide a pressure sensitive adhesive that is tack-free to the touch, but forms a permanent bond under moderate bonding pressure.

It is another object of the invention to provide a pressure sensitive adhesive that will not be adversely affected by contact with silicone or other oils.

These and other objects are achieved by the pressure sensitive adhesive of the invention which comprises a tacky adhesive latex, a non-tacky latex or polymer, and an inert filler. The adhesives prepared according to this invention are tack-free to the touch yet become activated to form a permanent bond under moderate sealing pressure.

Additional objects and advantages of the invention will be set forth in part in the description which follows, and in part will be apparent from the description, or may be learned by practice of the invention. The objects and advantages of the invention will be realized and attained by means of the compounds, compositions and processes particularly pointed out in the written description and appended claims.

DETAILED DESCRIPTION OF THE PREFERRED EMBODIMENTS

The first component of the adhesive of the present invention, a tacky adhesive latex, is generally a permanent acrylic-type adhesive latex. Acrylic emulsions such as Robond PS-60, Robond PS-61, and Rhoplex N-619 (marketed by Rohm & Haas Co., Philadelphia, Pa.) and Gelva RA 2397, RA 2404, and RA 2373 (marketed by Monsanto Co., St. Louis, Mo.) are examples of the tacky adhesive latex that may be used in accordance with the invention. Generally, these adhesives are copolymers of (1) a flexible alkyl acrylate or methacrylate having about 4 to about 12 carbon atoms, (2) a hard alkyl acrylate or methacrylate having 1 to about 4 carbon atoms, and (3) a functional monomer such as acrylic acid, methacrylic acid or vinyl pyrrolidone, or multifunctional monomers such as difunctional or trifunctional acrylates or methacrylates. The tacky material is the main ingredient, incorporated to produce a fiber tearing bond when sealing pressure is applied.

The second component of the composition of the invention may be either a non-tacky latex or a non-tacky polymer, or combinations thereof. Appropriate examples of non-tacky latexes that may be used include acrylate latexes, such as Rhoplex P-376 and B-85 (marketed by Rohm & Haas Co., Philadelphia, Pa.) and styrene-butadiene latexes such as Dow latex 620, 640 and 650 (marketed by Dow Chemical, Midland, Mich.). Appropriate examples of non-tacky polymers that may be used include adhesive-compatible, water-soluble polymers such as polyvinyl alcohol, starch and cellulose derivatives. The non-tacky material is incorporated to provide the anti-block characteristics of the adhesives during form handling and storage. Too much of this non-tacky material will reduce the sealing properties, while too little will result in blocking of the forms together.

The final component of the composition is an inert filler. Examples of appropriate fillers that may be used include high capacity oil-absorbing silicate powder, silica, titanium dioxide, and clays. The inert filler is incorporated to absorb oil. Generally, when silicone oil is used in the nip for sheet cut forms to protect the fuser roll, migration of the material to the adhesive surface will interfere with the sealing operation. The high oil-absorbing filler is incorporated to absorb this oil. The adhesive strength is greatly decreased if the filler is overdosed. However, the oil absorbing capability will be insufficient if it is underdosed.

A small amount of pigment or dye may also be added to make the adhesive-coated substrate more appealing to the eye.

The composition of the present invention preferably contains about 54 to about 84 parts of tacky adhesive latex, about 2 to about 25 parts of non-tacky latex or polymer and about 8 to about 35 parts of inert filler based upon 100 total parts, on a weight basis.

The composition according to the invention generally has a solids content of about 25 to about 40%, a pH of about 7 to about 10 and a viscosity of about 200 to about 2000 cps.

The composition of the invention can be coated on a substrate such as a sheet of about 12 to about 28 # bond paper at about 3.5 to about 15 microns thickness. Lab wire wound coating rod or production roll coaters can be adapted to perform the coating. Spraying, dipping or printing methods can also be employed. Other substrates may be coated besides paper, such as metal foil, polymer fibers such as cellophane, polyethylene terephthalate, olefin polymers and the like. After the adhesive mixture has been drawn onto the substrate, the sheet is allowed to dry or is passed through a heated oven to obtain a tack-free sheet.

The following examples are illustrative. Unless otherwise indicated, amounts shown are in parts by weight. The following testing procedures were used to determine % seal and % blocking.

Sealing Test Procedure

1. Coated sheets were cut into 3" by 8" rectangles.
2. The coated sheets were positioned adhesive-to-adhesive —10 sets were tested.

3. Coated sheets were sealed on a lab sealer at the conditions specified in the examples.

4. The sealed samples were slowly peeled apart and the % of samples with fiber tearing seals was recorded. This number was the % seal.

BLOCKING TEST PROCEDURE

This test measures paper to pressure-seal adhesive blocking. The test requires one 4×5 inch (¼ inch thick) piece of stainless steel for a base, one 1×3 inch (1 inch thick) piece of aluminum for the top, and a 6 pound weight.

1. 1×3 inch samples were cut from identical areas from 20 identical samples of sheets coated with adhesive.
2. The sample strips were stacked and aligned.
3. The aligned stack was placed on the stainless steel base and placed into the preheated oven (220° F.).
4. The top piece of aluminum was carefully placed onto the stack.
5. The 6-pound weight was placed on top of the stack and the oven door was closed.
6. After 30 minutes, the samples were removed from the oven and checked for any blocking (sticking together). The % of samples with blocking was recorded. This number was the % blocking.

EXAMPLE 1

56.6 parts of Robond PS-61 Latex (an acrylic latex, from Rohm and Haas) was compounded with 8 parts of dry Cabosil 5M (a silica from Peltz Rowley Chemicals) and 24 parts of Dow latex 620 (50% solid). The resultant mixture was drawn down onto a 24# OCR bond paper and dried to 10–12 microns thickness. The coating is tack-free to the touch, yet it forms a good fiber tearing bond on a blank bond paper under 200 psi seal pressure.

EXAMPLES 2–5

Robond PS-60 acrylate latex was compounded with Rhoplex latex B-85, and Cab-o-sperse (a colloidal silica from Cabot Corp.) and coated on 24# bond paper. The coating was assembled with a blank sheet and sealed under 100 psi pressure. The assembled sheets were placed in a 65° C. oven for 7 days, after which % seal was tested and recorded. Results are shown below.

| Ex. | PS-60 | B-85 | Silica | Caliper (u) | % Blocking | % Seal |
|---|---|---|---|---|---|---|
| 2 | 73 | 12 | 15 | 6.5 | some | 100 |
| 3 | 77 | 8 | 15 | 6.0 | some | 100 |
| 4 | 68 | 12 | 20 | 7.9 | 0 | 100 |
| 5 | 72 | 8 | 20 | 5.5 | 0 | 100 |

EXAMPLES 6–9

Robond PS-60 acrylate latex was compounded with Rhoplex latex P-376, and Cab-o-sperse and coating on 24# bond paper. The coating was assembled with a blank sheet and sealed under 100 psi pressure. The assembled sheets were placed in a 65° C. oven for 7 days, after which % seal was tested and recorded. Results are shown below.

| Ex. | PS-60 | B-376 | Silica | Caliper (u) | % Blocking | % Seal |
|---|---|---|---|---|---|---|
| 6 | 80 | 10 | 10 | 5.1 | 0 | 100 |
| 7 | 72 | 6 | 22 | 4.6 | 0 | 100 |
| 8 | 68 | 16 | 16 | 5.5 | 0 | 100 |
| 9 | 72 | 8 | 20 | 5.5 | 0 | 100 |

EXAMPLES 10–11

Robond PS-60 acrylate latex was compounded with Dow latex 620, and Exsilon (a silicate powder from Engelhard Chemicals) and coated on 24# bond paper. The coating was assembled with a blank sheet and sealed under 100 psi pressure. The assembled sheets were placed in a 65° C. oven for 7 days, after which % seal was tested and recorded. Results are shown below.

| Ex. | PS-60 | Exsilon | Dow 620 | Caliper (u) | % Blocking | % Seal |
|---|---|---|---|---|---|---|
| 10 | 70 | 10 | 20 | 9.1 | 0 | 100 |
| 11 | 64 | 30 | 6 | 8.9 | 0 | 100 |

EXAMPLES 12–14

Robond PS-60 acrylate latex was compounded with Dow latex 620 and titanium dioxide and coated on 24# bond paper. The coating was assembled with a blank sheet and sealed under 100 psi pressure. The assembled sheets were placed in a 65° C. oven for 7 days, after which % seal was tested and recorded. Results are shown below.

| Ex. | PS-60 | Titanium Dioxide | Dow 620 | Caliper (u) | % Blocking | % Seal |
|---|---|---|---|---|---|---|
| 12 | 70 | 20 | 10 | 7.8 | 0 | 100 |
| 13 | 64 | 30 | 6 | 6.7 | 0 | 100 |
| 14 | 84 | 12 | 4 | 5.9 | 0 | 100 |

EXAMPLES 15–27

Robond PS-60 acrylate latex was compounded with Dow latex 620 and Cab-o-sperse and coated on 24# bond paper. % Seal was tested after 7 days of aging at 95% humidity, 37° C. Sealing pressure was set at 60 psi. Results are shown below.

| Ex. | PS-60 | Latex | Silica | Caliper (u) | % Blocking | % Seal |
|---|---|---|---|---|---|---|
| 15 | 54 | 12 | 34 | 5.2 | 0 | 5 |
| 16 | 54 | 12 | 34 | 4.5 | 0 | 0 |
| 17 | 60 | 6 | 34 | 5.9 | 0 | 5 |
| 18 | 60 | 6 | 34 | 4.8 | 0 | 50 |
| 19 | 64 | 9 | 27 | 4.1 | 0 | 100 |
| 20 | 64 | 9 | 27 | 5.0 | 0 | 100 |
| 21 | 68 | 12 | 20 | 4.6 | 10 | 80 |
| 22 | 68 | 12 | 20 | 3.7 | 0 | 55 |
| 23 | 72 | 6 | 22 | 6.5 | 0 | 100 |
| 24 | 74 | 6 | 20 | 4.1 | 0 | 100 |
| 25 | 74 | 6 | 20 | 4.2 | 0 | 100 |
| 26 | 75 | 10 | 15 | 7.5 | 0 | 100 |
| 27 | 80 | 10 | 10 | 8.8 | 0 | 100 |

At 100 psi sealing pressure, every sample sealed.

EXAMPLES 28–30

Gelva 2397 (from Monsanto) was compounded with Rhoplex B-85 and Cab-o-sperse and coated on 24# bond paper. The coating was assembled with a blank sheet and sealed under 100 psi pressure. The assembled sheets were placed in a 60° C. oven for 7 days, after which % seal was tested and recorded. Results are shown below.

| Ex. | Gelva 2397 | Silicate B-85 | Caliper (u) | % Blocking | % Seal |
|---|---|---|---|---|---|
| 28 | 70 | 24 | 6 | 6.7 | 0 | 100 |
| 29 | 68 | 24 | 8 | 5.3 | 0 | 100 |
| 30 | 66 | 24 | 10 | 7.1 | 0 | 100 |

EXAMPLES 31-33

Robond PS-60 acrylate latex was compounded with Vinol 523 (a partially hydrolyzed polyvinyl alcohol from Air Products and Chemicals), and Nipsil (a Japanese colloidal silica) and coated on 24# bond paper. % Seal was tested after 7 days of aging at 60° C. Sealing pressure was set at 100 psi. Results are shown below.

| Ex. | PS-60 | Vinol | Silica | Caliper (u) | % Blocking | % Seal |
|---|---|---|---|---|---|---|
| 31 | 78 | 2 | 20 | 5.1 | 0 | 100 |
| 32 | 74 | 2 | 24 | 5.1 | 0 | 100 |
| 33 | 76 | 3 | 21 | 5.7 | 0 | 100 |

Other embodiments of the invention will be apparent to those skilled in the art from consideration of the specification and practice of the invention disclosed herein. It is intended that the written description of the specification and examples be considered exemplary only, with the true scope and spirit of the invention being indicated by the appended claims.

What is claimed is:

1. A pressure sensitive adhesive composition comprising a tacky adhesive latex, a non-tacky latex or polymer, and an inert filler, wherein said components are present in an amount effective to create an adhesive that is tack-free to the touch but forms a permanent bond upon the application of pressure and wherein said inert filler is present in an amount effective to absorb oil.

2. The composition of claim 1, wherein said tacky adhesive latex is present in an amount ranging from about 54 to about 84% by weight, said non-tacky latex or polymer is present in an amount ranging from about 2 to about 25% by weight, and said inert filler is present in an amount ranging from about 8 to about 35% by weight.

3. The composition of claim 1, wherein said tacky adhesive latex is an acrylic-type latex.

4. The composition of claim 3, wherein said tacky adhesive latex is a copolymer of (a) a flexible alkyl acrylate or methacrylate having from about 4 to about 12 carbon atoms, (b) a hard alkyl acrylate or methacrylate having 1 to about 4 carbon atoms, and (c) a functional or multifunctional monomer.

5. The composition of claim 4, wherein said functional monomer is selected from acrylic acid, methacrylic acid and vinyl pyrrolidone and said multifunctional monomer is selected from difunctional or trifunctional acrylates or methacrylates.

6. The composition of claim 1, wherein said non-tacky latex or polymer is selected from acrylate latexes, styrene-butadiene latexes, polyvinyl alcohol, starch and cellulose, or derivatives thereof.

7. The composition of claim 1, wherein said inert filler is selected from silica, silicate powders, titanium dioxide and clays, or mixtures thereof.

8. The composition of claim 1, further comprising a pigment or dye.

* * * * *